United States Patent [19]

Highsmith

[11] Patent Number: 4,909,402

[45] Date of Patent: Mar. 20, 1990

[54] COMBINATION FOR SHELFING SYSTEM

[75] Inventor: Charles E. Highsmith, Springfield, Tenn.

[73] Assignee: Unarco Industries, Inc., Chicago, Ill.

[21] Appl. No.: 216,122

[22] Filed: Jul. 7, 1988

[51] Int. Cl.4 .............................................. A47F 5/00
[52] U.S. Cl. ................................... 211/184; 211/59.2
[58] Field of Search ............. 211/184, 183, 175, 59.2; 24/625; 248/220.2, 221.1; 108/60, 61

[56] References Cited

U.S. PATENT DOCUMENTS

| | | | |
|---|---|---|---|
| 1,031,447 | 7/1912 | Hohenberger | 24/625 X |
| 3,269,557 | 8/1966 | Wahl | |
| 3,703,964 | 11/1972 | Field | 211/184 |
| 4,186,830 | 2/1980 | Corey | |
| 4,239,100 | 12/1980 | Corey | |
| 4,372,451 | 2/1983 | Rasmussen et al. | |
| 4,383,614 | 5/1983 | Miller | |

Primary Examiner—J. Franklin Foss
Assistant Examiner—Sarah A. Lechok
Attorney, Agent, or Firm—Dressler, Goldsmith, Shore, Sutker & Milnamow Ltd.

[57] ABSTRACT

For a shelving system or the like, a combination comprising a framework including a transverse member, a longitudinal divider having two legs that are spaced-apart by a predetermined distance except in a localized region along the longitudinal divider, and including a clip, which is adapted to be adjustably positioned along the longitudinal divider, for drawing the legs toward each other in the localized region. An outer, upturned flange extends from the lower end of each leg of the longitudinal divider. The transverse member has a plurality of pegs extending upwardly and being spaced uniformly from one another along the transverse member. Each peg has an upright portion and a transverse portion. The longitudinal divider is adapted to interengage with the transverse member where the legs are spread-apart by the predetermined distance, such that the outer flanges are disposed beneath the transverse portions of a selected two of the pegs and engage the upright portions of the selected pegs with one of the remaining pegs between the legs, so as to prevent the longitudinal divider from disengaging vertically from the transverse member at either leg and from bowing to either side. The legs of the longitudinal divider can pass, in the localized region, between the transverse portions of the selected pegs. The clip thus facilitates interengagement of the longitudinal divider with and disengagement of the longitudinal divider from the transverse member.

5 Claims, 1 Drawing Sheet

U.S. Patent   Mar. 20, 1990   4,909,402
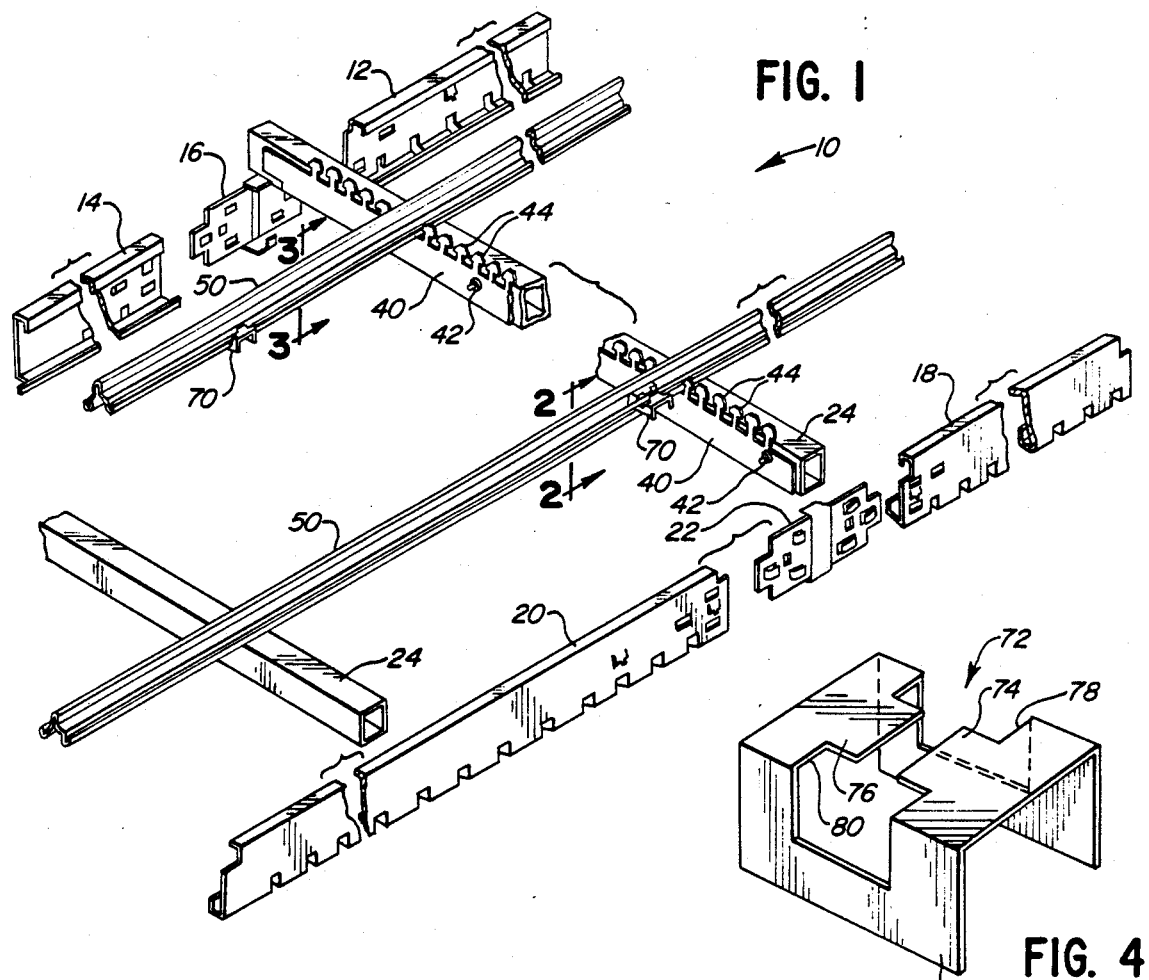
FIG. 1
FIG. 4
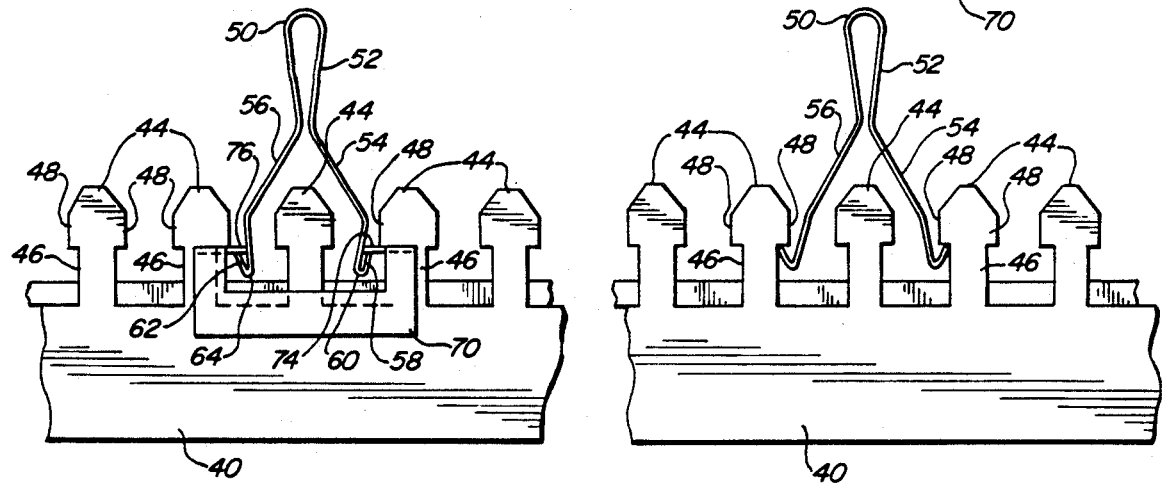
FIG. 2
FIG. 3

COMBINATION FOR SHELFING SYSTEM

BACKGROUND OF THE INVENTION

This invention pertains to an improved combination comprising a transverse member and a longitudinal divider, which can be easily connected to each other at an intermediate location along the longitudinal divider, for a shelving system or the like.

Typically, in a shelving system of a type wherein merchandise is gravity-fed along inclined tracks extending from the back of the shelving system to the front of the shelving system, longitudinal dividers are employed, which extend in parallel relation to the tracks so as to divide merchandise on the tracks into segregated lanes. It is known for such dividers to be quite long (e.g., eight feet longer, or longer) whereupon such dividers must be somehow connected at intermediate locations along such dividers to a transverse member of the shelving system so as to prevent such dividers from bowing to either side when bumped or pressed by merchandise on the tracks. Typically, such dividers are connected so as to be easily disconnected, not permanently, whereby such dividers can be easily adjusted whenever intended usage of the shelving system changes. Particular difficulties are presented by long dividers to be thus connected to a transverse member beyond the unaided reach of a person seeking to connect such dividers to the transverse member Rasmussen et al. U.S. Patent No. 4,372,451 discloses a way to connect a longitudinal divider to a transverse member, in such a system. A pin is disclosed, which extends downwardly from the longitudinal divider into a selected one of a series of holes in the transverse member. The pin is adjustable longitudinally along the longitudinal divider. Precise adjustment of the pin along the longitudinal divider and precise manipulation of the longitudinal divider from its opposite ends so as to manipulate the pin into the selected hole appear necessary for the longitudinal divider to be effectively connected to the transverse member. Such a connection may prevent bowing of the longitudinal divider to either side but may not prevent the longitudinal divider from lifting in relation to the transverse member.

Heretofore, there has remained a need, to which this invention is addressed, for an improved, simpler, easier-to-use way to connect a longitudinal divider to a transverse member, in a shelving system or the like.

SUMMARY OF THE INVENTION

This invention provides, for a shelving system or the like, a combination comprising a framework including a transverse member, a longitudinal divider having two legs that are spaced-apart by a predetermined distance except in a localized region along the longitudinal divider, and means for drawing the legs toward each other in the localized region. An outer flange, which preferably is upturned, extends from the lower end of each leg. Thus, the legs are spaced apart by the predetermined distance along a relatively long portion of the longitudinal divider. Also, the legs are drawn toward each other by such means along a relatively short portion of the longitudinal divider.

The transverse member has a plurality of pegs extending upwardly and being spaced uniformly from one another along the transverse member. Each peg has an upright portion and a transverse portion.

The longitudinal divider is adapted to interengage with the transverse member where the legs are spread-apart by the predetermined distance, such that the outer flanges are disposed beneath the transverse portions of a selected two of the pegs and engage the upright portions of the selected pegs with at least one of the remaining pegs, preferably one peg, between the legs, so as to prevent the longitudinal divider from disengaging vertically from the transverse member at either leg and from bowing to either side.

The means for drawing the legs toward each other in the localized region functions such that the legs can pass, in the localized region, between the transverse portions of the selected pegs, so as to facilitate interengagement of the longitudinal divider with and disengagement of the longitudinal divider from the transverse member.

Preferably, such means includes a clip, which is adapted to be adjustably positioned along the longitudinal divider so as to draw the legs together in the localized region, as mentioned above. The clip can have a pair of flanges engaging the respective legs of the longitudinal divider with each leg flange of the longitudinal divider disposed beneath, and preferably engaged with, one of the clip flanges.

These and other objects, features, and advantages of this invention will be evident from the following description of a preferred embodiment of this invention with reference to the accompanying drawings.

BRIEF DESCRIPTION OF THE DRAWINGS

FIG. 1 is a partly exploded, perspective view of certain components of a shelving system, those components comprising two longitudinal dividers, a transverse member, and a clip associated with each longitudinal divider, in a combination constituting a preferred embodiment of this invention.

FIG. 2 is a fragmentary, sectional view, as taken along line 2—2 of FIG. 1 in a direction indicated by arrows.

FIG. 3 is a fragmentary, sectional view, as taken along line 3—3 in FIG. 1 in a direction indicated by arrows.

FIG. 4 is a perspective view of a representative one of the clips shown in FIG. 1.

DETAILED DESCRIPTION OF PREFERRED EMBODIMENT

As shown in FIG. 1, a shelving system 10 of a type wherein merchandise is gravity-fed on inclined tracks from the back of the shelving system to the front of the shelving system and wherein such tracks are arranged in multiple tiers, a portion of one tier of the shelving system 10 being shown in FIG. 1, comprises side members 12, 14, which are spliced together by a side splice 16 on the left side of the tier shown in FIG. 1, and side members 18, 20, which are spliced together by a side splice 22 on the right side of the tier shown in FIG. 1. The shelving system 10 also comprises a plurality of track-supporting rails 24, two being shown, which are mounted in a known manner to the side members, or to the side splices, so as to extend transversely between the side members on the right and left sides of the tier shown in FIG. 1, and a plurality of merchandise-supporting tracks (not shown) each of which is provided with a plurality of rollers, and which are supported in a known manner on the track-supporting rails 24 so as to extend longitudinally, in transverse relation to the track-supporting rails 24, between a rear shelf member (not shown) and a front shelf member (not shown). Except for the rollers, which may be molded of a suitable polymer, a d except possibly for fasteners and other incidental parts, the shelving system 10 is constructed of sheet metal, preferably sheet steel.

Preferably, the merchandise-supporting tracks, the rear shelf member and the front shelf member are constructed in accordance with Corey et. al. U.S. Pat. No. 4,186,830 and Corey U.S. Pat. No. 4,239,100, the disclosures of which patents are incorporated by reference herein. These patents disclose preferred constructions for the merchandise-supporting tracks. Also, these patents disclose alternative constructions for the rear and front shelf members respectively, either set of alternative constructions being useful in the shelving system 10. In either instance, the side members 12, 14, the side splice 16, the side members 18, 20, and the side splice 22 may be constructed in accordance with known practices in the art. Thus, except as explained below, the shelving system 10 may be constructed in accordance with known practices in the art.

As shown in FIG. 1, a transverse member 40 is mounted to one of the track-supporting members 24, by means of screws 42, so as to extend transversely between the side members. As shown, the transverse member 40 has a large number of pegs 44 extending upwardly, above the track-supporting member 24 associated with the transverse member 40, and being spaced uniformly from one another along the transverse member 40. Each peg 44 has an upright portion 46 and a transverse portion 48, which extends to each side of the upright portion 46, as shown in FIGS. 2 and 3. It is not necessary, however, for the transverse portions 48 of the endmost pegs 44 to extend to the sides where there are no more pegs.

The shelving system 10 comprises a plurality of longitudinal dividers 50, two being shown in FIG. 1. Each longitudinal divider 50 is fabricated from sheet metal, preferably sheet steel, so as to have an upright portion 52, which functions to segregate merchandise on the merchandise-supporting tracks, and so as to have two spread-apart legs, i.e., a right leg 54 and a left leg 56. Each leg includes an upturned, outer flange extending from its lower end. Thus, an upturned, outer flange 58 extends from the lower end 60 of the right leg 54, and an upturned outer flange 62 extends from the lower end 64 of the left leg 56. The legs 54, 56, are spread-apart by a predetermined distance along a relatively long portion of each longitudinal divider 50, i.e., except in a localized region to be later discussed.

Each longitudinal divider 50 is adapted to interengage with the transverse member 40 where the legs 54, 56, of such longitudinal divider 50 are spread-apart by the predetermined distance, as shown in FIG. 3, such that the outer flanges 58, 62, of such longitudinal divider 50 are disposed beneath the transverse portions 48 of a selected two of the pegs 44 and engage the upright portions 46 of the selected two of the pegs 44 with at least one of the remaining pegs 44, one being shown, between the legs 54, 56, of such longitudinal divider 50. Thus, the outer flanges 58, 62, are hooked beneath the transverse portions 48 of the selected two of the pegs 44 and between the upright portions 46 of the selected two of the pegs 44, so as to prevent such longitudinal divider 50 from bowing to either side and from disengaging vertically from the transverse member 40.

As shown, a clip 70 is associated with each longitudinal divider 50 for drawing the legs 54, 56, of such longitudinal divider 50 toward each other along a relatively short portion of such longitudinal divider 50, i.e., in the localized region. The localized region extends, in the preferred embodiment, about six inches along such longitudinal divider 50 in each direction from the associated clip 70, such that the legs 54, 56, of such longitudinal divider 50 can pass, in the localized region, between the transverse portions 48 of a selected two of the pegs 44 with at least one of the pegs 44, one being shown, between the legs 54, 56, of such longitudinal divider 50.

Each clip 70 is fabricated from sheet metal, as shown, preferably from sheet steel, or molded from a suitable polymer so as to define a longitudinal, generally U-shaped cavity 72, which receives the lower ends 60, 64, of the respective legs 54, 56, and so as to have flanges extending transversely toward each other and extending respectively from the upper, right and left, longitudinal edges of the receptacle 72. Thus, the flange 74 extends transversely toward the flange 76 from the upper, right, longitudinal edge 78 of the receptacle 72, and the flange 76 extends transversely toward the flange 74 from the upper, left, longitudinal edge 80 of the receptacle 72.

Each longitudinal divider 50 can be easily installed by one person, or two persons, with access only to the opposite ends (not shown) of such longitudinal divider 50. The clip 70 associated with such longitudinal divider 50 must be initially mounted on such longitudinal divider 50, by drawing its legs 54, 56, toward each other with a slip-joint pliers (not shown) or another suitable tool and fitting such longitudinal divider 50 into the cavity 72 of the associated clip 70, as shown in FIG. 2, with the legs 54, 56, of such longitudinal divider 50 being disposed between the flanges 74, 76, of the associated clip 70 and with the associated clip 70 being located approximately twelve inches, or farther, from the location where such longitudinal divider 50 will cross the transverse member 40 when such longitudinal divider 50 interfits at its opposite ends the rear and front shelf members of the shelving system 10. Being fabricated from sheet metal, preferably from sheet steel, such longitudinal divider 50 has sufficient springiness for its legs 54, 56, to fit tightly between the flanges 74, 76, of the associated clip 70 with the flanges 58, 62, on the respective legs 54, 56, being beneath and engaging the respective flanges 74, 76, when such longitudinal divider 50 is released from the aforementioned tool. It should be here recalled that the localized region (in which the associated clip 70 draws the legs 54, 56, of such longitudinal member 50 toward each other such that the legs 54, 56, of such longitudinal member 50 can pass between the transverse portions 48 of the selected pegs 44 associated with such longitudinal member 50) extends, in the preferred embodiment, about six inches along such longitudinal divider 50 in each direction from the associated clip 70. The legs 54, 56, of such longitudinal divider 50 can be then passed between the transverse portions 48 of the selected pegs 44 associated with such longitudinal member 50, as shown in FIG. 2, whereupon such longitudinal divider 50 can be longitudinally adjusted until its outer flanges 58, 62, are disposed between the transverse portions 48 of the same pegs 44, as shown in FIG. 3, and whereupon such longitudinal divider 50 can be further adjusted so as to interfit (as the track-supporting members interfit at their opposite ends with the rear and front shelf members, as disclosed in the aforesaid Corey et al. and Corey patents whose disclosures have been incorporated by reference herein) at its opposite ends with the rear and front shelf members respectively.

Accordingly, each longitudinal divider 50 can be easily relocated along the transverse member 40 from any given location permitted by the pegs 44, and by the rear and front shelf members, to any other location permitted by the pegs 44, and by such shelf members. Spacing of the pegs 44 is coordinated with spacing of the openings of the rear and front shelf members of the shelving system 10 (see the aforesaid Corey et al. and Corey patents whose disclosures have been incorporated by reference herein) so as to permit each longitudinal divider 50 to be so located without interference at such shelf members.

Various modifications may be made to the combination described above without departing from the scope and spirit of this invention.

What is claimed is:

1. For a shelving system, a combination comprising:
   (a) a framework including a transverse member, which has a plurality of pegs extending upwardly and being spaced uniformly from one another along the transverse member, each peg having an upright portion and a transverse portion,
   (b) a longitudinal divider, which has two legs that are spread-apart by a predetermined distance along a relatively long portion of the longitudinal divider, each leg having a lower end and including an outer flange extending from the lower end of such leg, and which is adapted to interengage with the transverse member, where the legs are spreadapart by the predetermined distance, such that the outer flanges are hooked beneath the transverse portions of a selected two of the pegs and between the upright portions of the selected two of the pegs with at least one of the remaining pegs between the legs, so as to prevent the longitudinal divider from disengaging vertically from the transverse member at either leg and from bowing to either side, and
   (c) means for drawing the legs toward each other along a relatively short portion of the longitudinal divider, such that the legs can pass, where drawn toward each other, between the transverse portions of the selected two of the pegs, so as to facilitate interengagement of the longitudinal divider with and disengagement of the longitudinal divider from the transverse member.

2. The combination of claim 1 wherein said means includes a clip, which is adapted to be adjustably positioned along the longitudinal divider so as to draw the legs toward each other in a localized region such that the legs can pass, in the localized region, between the transverse portion of the same two of the pegs.

3. The combination of claim 1 wherein each flange is upturned.

4. The combination of claim 3 wherein said means includes a clip, which is adapted to be adjustably positioned along the longitudinal divider as to draw the legs toward each other in a localized region such that the legs can pass, in the localized region, between the transverse portions of the same two of the pegs, and which has a pair of flanges engaging the respective legs of the longitudinal divider with each of the flanges of the legs of the longitudinal divider disposed beneath one of the flanges of the clip.

5. The combination of claim 4 wherein each of the flanges of the legs of the longitudinal divider engages one of the flanges of the clip.

* * * * *

UNITED STATES PATENT AND TRADEMARK OFFICE
CERTIFICATE OF CORRECTION

PATENT NO. : 4,909,402

DATED : March 20, 1990

INVENTOR(S) : Charles E. Highsmith

It is certified that error appears in the above-identified patent and that said Letters Patent is hereby corrected as shown below:

On the title page:

Title should be --COMBINATION FOR SHELVING SYSTEM-- instead of COMBINATION FOR SHELFING SYSTEM.

Col. 3, line 4, "a d" should be --and--.

Claim 2, Col. 6, line 19, "portion" should be --portions--.

Claim 4, Col. 6, line 25 --so-- should be inserted before "as".

Signed and Sealed this

Thirteenth Day of August, 1991

*Attest:*

HARRY F. MANBECK, JR.

*Attesting Officer*  *Commissioner of Patents and Trademarks*